Jan. 5, 1965  L. K. KOSOWSKY  3,164,058
FILM PROJECTOR AND OPTICAL SYSTEM THEREFOR
Filed Dec. 1, 1960
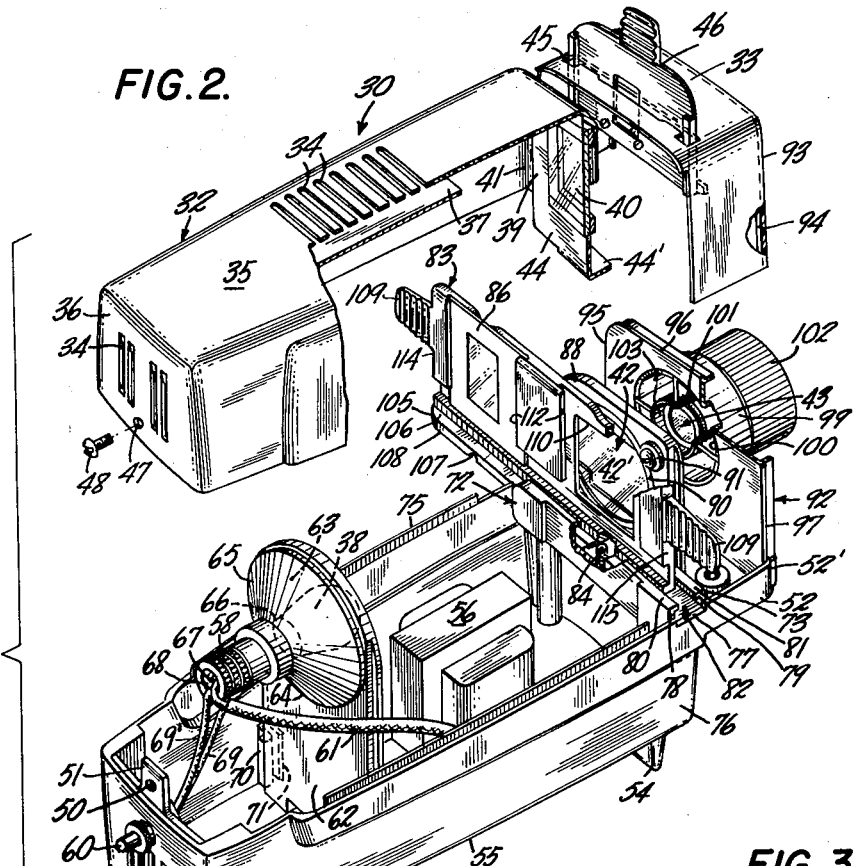
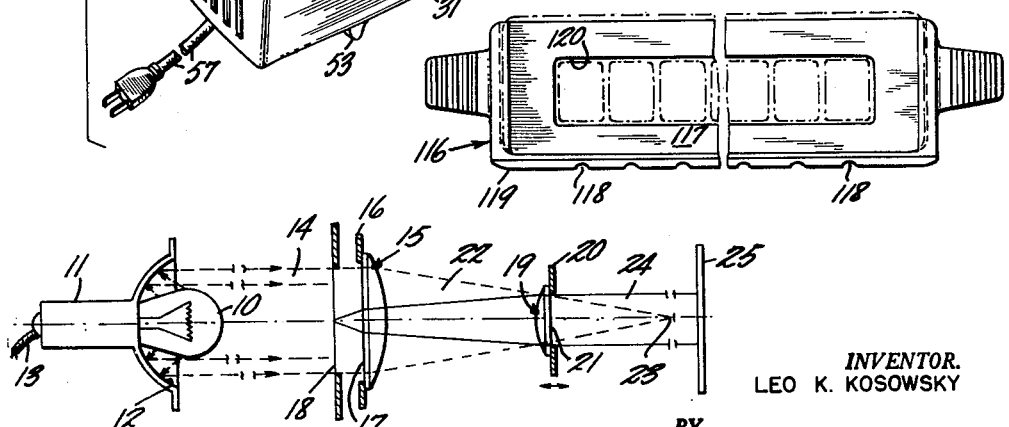
INVENTOR.
LEO K. KOSOWSKY
BY
his ATTORNEYS.

United States Patent Office 3,164,058
Patented Jan. 5, 1965

3,164,058
FILM PROJECTOR AND OPTICAL SYSTEM THEREFOR
Leo K. Kosowsky, Bridgeport, Conn., assignor to Columbia Broadcasting System, Inc., New York, N.Y., a corporation of New York
Filed Dec. 1, 1960, Ser. No. 72,915
2 Claims. (Cl. 88—26)

The present invention relates to projectors for slides and strip film and, more particularly, to a projector embodying a novel optical projection system.

Heretofore, film projection systems have generally required a condensing lens, formed by one or more adjacently positioned lens elements placed between the light source and the film, and an objective lens, formed by one or more adjacently positioned lens elements on the other side of the film, to project an image of the film onto a screen. In such systems, the condensing lens functions only to condense light from the light source and direct it through the film while the objective lens is designed solely to form an image of the film on the screen. Frequently, only a single-element objective lens is used and this severely limits the extent to which optical aberrations can be corrected.

Accordingly, it is an object of the present invention to provide a new and improved film projector which eliminates the above-mentioned disadvantages of present projectors.

Another object of the invention is to provide a film projector of simple design utilizing a minimum number of lens elements while, at the same time, providing improved image quality.

A further object of the invention is to provide a projector of the above character capable of projecting images from different sizes of film.

These and other objects of the invention are attained by providing a film projector having an optical projection system including a light source, a first lens element having substantially the same area as the film area to be projected, a film holder adapted to hold the film in a plane between the light source and the first lens element and adjacent to the first lens element, and a second lens element adapted, in conjunction with the first lens element, to form a projected image of film in the film holder. Preferably, the first lens element is fixed in position and the second element is relatively movable to provide a focusing adjustment. In addition, the film holder may be removably mounted in the projector so that it can be replaced by other holders for supporting different sizes of film, a detent being provided to retain the holder in position in the projector.

Further objects and advantages of the invention will be apparent from a reading of the following detailed description when taken in conjunction with the drawings, wherein;

FIG. 1 is an optical schematic diagram of the projection system of the invention;

FIG. 2 is a perspective view of a film projector arranged in accordance with the invention wherein a portion of the projector housing has been partially removed for convenience of illustration; and FIG. 3 is a front elevation view of a form of film holder adapted to hold strip film in the projector shown in FIG. 2.

As illustrated in the diagrammatic view of FIG. 1, the novel projection system of the present invention comprises a lamp 10, which functions as the light source of the system, mounted in a holder 11, having a parabolic reflector surface 12 adjacent to the rear of the lamp 10, the plane in which the lamp 10 is mounted being coincident with the principal axis of the parabolic reflector 12. In order to energize the lamp 10, an electrical cable 13 is attached to the holder 11 and is electrically connected to the lamp through a socket within the holder. Light rays from the lamp 10 are collimated by the parabolic reflector 12 to form a beam 14 directed toward a film area 18 to be projected and having a diameter substantially equal to the maximum dimension of the film area.

In accordance with the invention, a plano-convex lens 15, which functions as both a condensing and an objective lens element, is mounted in a holder 16 forwardly from and adjacent to the film 18, the diameter of this lens being substantially equal to the maximum dimension of the film area to be projected. Preferably, in order to avoid interference with a film holder, the plane face 17 of the lens 15 is placed adjacent to the film 18. The projection system also includes an axially adjustable member which, in the illustrated embodiment of the invention, comprises a single plano-convex lens element 19 supported in an adjustable mount 20 with its plane surface 21 facing forwardly. Consequently, light rays from the film area 18 are projected by the elements 15 and 19 in a path 24 to a distant screen 25.

With the above arrangement all the light passing through the film area 18 is condensed by the lens 15 in a converging cone 22 which completely fills the adjustable lens element 19 in its normal position. At the same time, the characteristics of the lens element 15 are selected in conjunction with those of the element 19 to provide improved image quality as compared with that obtainable with a single lens element. By the same token, the image quality of projection systems having an objective lens with two or three elements can be similarly improved by placing the condensing lens element in front of the film and selecting its characteristics in an appropriate manner with respect to those of the other elements.

A typical projector 30 embodying the optical system of the present invention is illustrated in FIG. 2 and includes a lower housing portion 31, an upper housing portion 32, and a front cover portion 33, each of which may be made of a suitable plastic material, the upper portion 32 and the front portion 33 serving as covers for the lower portion, in which substantially all of the components of the projector are mounted. The upper portion 32 has a plurality of slotted openings 34 in its top wall 35 and in the rear end wall 36 for ventilation purposes and a strip of metal 37 is mounted just below the top wall and adjacent to the slotted openings to absorb heat radiated by a lamp 38 included in the lower portion 31 of the projector.

Preferably, a glass window 40 is supported in a holder 39 which is mounted in the front wall 41 of the upper portion so that the glass will be positioned just to the rear of the film plane and, if desired, the window 40 may be made of heat-absorbing glass to prevent buckling of the film. In addition, a lip 44' extends forwardly from the bottom portion 44 of the holder 39 and this lip engages the bottom surface of a cross-piece 72 in the lower portion 31 to hold these two portions together when they are assembled. These portions are also held together by a screw 48 passing through a hole 47 in the rear wall of the upper portion and into a threaded hole 50 in a projecting part 51 of the lower portion.

The front cover portion 33 provides an enclosure for a fixed lens element 42 and an adjustable element 43 and this portion includes an opening 45 carrying a vertically slidable masking element 46 immediately in front of the fixed lens 42. When full size film areas are projected this mask is pulled up out of the light path to expose the entire area of the fixed lens 42 to the objective lens 43. On the other hand when the film area is smaller than the area of the fixed lens, the mask is moved downwardly into the light path to restrict the effective area of the lens 42 correspondingly and prevent adjacent film areas from being projected.

The lower housing portion 31 is of generally rectangular configuration and has a forwardly projecting shelf 52 to support the adjustable lens element 43 and also includes two support members 53 and 54 extending downwardly from the bottom 55 of the housing. Within the lower portion 31 there is a step-down transformer 56 which receives power through a supply cord 57 and energizes the lamp 38 through a cable 61 leading to a socket 58 in which the lamp is supported, a control switch 60 at the rear of the housing being connected in series with the lamp by two wires 69 and 69'. Near the rear of the lower housing portion 31, a vertical support plate 62 is slidably received in grooves formed by projections 70 and 71 from each of the sidewalls 75 and 76, and, near its upper end, this plate has a conical recess 65 to receive a parabolic reflector 63. In addition, there is a central opening 66 in the plate to receive the socket 58 so as to hold the filament of the lamp 38 at the focal point of the parabolic reflector 63, thereby producing a collimated beam of light directed toward the lens element 42.

In order to hold a piece of film in position in the projector, the cross piece 72 has a central channel 82 defined by a horizontal bottom surface 77 and two vertical side walls, 78 and 79, each of which is formed with inwardly projecting lips 80 and 81 so as to receive a film holder 83. At the center of the channel 82, a spring-loaded detent 84 projects upwardly into the channel to cooperate with corresponding detent notches in the film holder for retaining the holder in position.

Affixed to the cross piece 72 immediately in front of the channel 82 a vertical support member 88 having a central opening 90 holds the fixed lens 42 in position with the plane surface 42' adjacent to the film plane, the lens element being held in place by any suitable means such as a retaining washer 91. With this arrangement, the same member supports the fixed lens and the film so that their relative axial positions are accurately maintained.

The front cover member 33, which is adapted to be attached to the projecting shelf 52 of the lower housing portion by screws (not shown), has an internal groove 94 adjacent to its forward edge 93 which cooperates with the forward end 52' of the shelf 52 when the two are assembled to retain a lens board 92, having corresponding flanges 95, 96 and 97 on its top and side edges, in position in the housing. In order to provide for axial adjustment of the lens element 43, the lens board 92 is formed with a tubular projection 99 having an internally threaded central opening 100. A tubular lens holder 102 having corresponding threads 101 carries the element 43 in an internal passage 103, so that rotation of the holder 102 provides axial motion of the element 43.

The film holder 83 which is shown in FIG. 2 is adapted to carry two 35 mm. film slides such as the slide 86. In order to mate with the groove 82, the bottom edge of the holder has projecting flanges 106 adapted to be received beneath the lips 80 and 81. Two apertures 110 are provided in the film holder 83 and flanged portions 112 adjacent to each aperture are arranged to hold 35 mm. slides in position. In addition, two detent notches 107, one beneath the center of each aperture 110, are cut into the bottom surface 108 of the holder, and these cooperate with the detent 84 to hold the film slides at the desired position in the projector. Two arms 109, attached to opposing ends 114 and 115 of the film holder 83, facilitate manual operation of the holder.

Another form of film holder 116 adapted for use with the projector is illustrated in FIG. 3. In this case, the holder is arranged to receive a card 117, illustrated in the dotted outline, wherein 35 mm. strip film is mounted for frame-by-frame projection through a central aperture 120. The bottom surface 119 of this holder has a plurality of detent notches 118, one beneath each frame position, to cooperate with the detent 84 in the manner described above. When this film holder is used, the mask 46 is moved down into the light path since the area of each frame is substantially smaller than the area of 35 mm. slides.

It will be readily apparent that the novel projector described herein provides improved image quality with a relatively simple projection system since, as pointed out above, the fixed lens, being in front of the film, acts as an imaging lens as well as a condensing lens. Moreover, the focal length of the fixed lens 42 can be appropriately selected in accordance with the free aperture of the adjustable lens 43 and the spacing between the lenses so as to obtain a suitable compromise between image definition and illumination.

Although the invention has been described herein with reference to a specific embodiment, many modifications and variations therein will be readily apparent to those skilled in the art. For example, the projector could be made to accommodate film sizes other than 35 mm. slides and strip film and the fixed and movable lens elements may each be supplemented with additional lens elements to improve the image quality. Accordingly, all such variations and modifications are included within the intended scope of the invention, as defined by the following claims.

I claim:
1. A film projector comprising a housing, a light source mounted near the rear of the housing including a reflector for projecting straight substantially parallel rays of light forwardly within the housing, a support member fixed within the housing in front of the light source at a location in the path of the straight substantially parallel rays adapted to slidably receive a film holder in the direction transverse to the path of light, a film holder adapted to be received in the support member and arranged to hold a piece of film having a given maximum dimension of the picture area in the path of the substantially parallel rays, first lens means comprising a planoconvex lens element having a diameter no less than approximately the maximum dimension of the picture area, fixed in position on the support member immediately in front of the path of the film holder and with its plane surface directed rearwardly, detent means in the support member and the film holder to releasably position the film holder in the transverse direction with respect to the first lens means, the first lens means being arranged to condense the parallel rays of light from the source in a forwardly converging cone after they have passed through the piece of film, second lens means having a smaller diameter than the first lens means mounted for axial adjustment in the housing and positioned to be substantially entirely within the converging cone and adapted, in conjunction with the first lens means, to project an image of a piece of film mounted in the film holder, wherein the housing comprises a lower portion supporting the light source, the support member and the first and second lens means, an upper portion comprising a cover to enclose the part of the housing to the rear of the path of the film holder, and a front cover portion to enclose the part of the housing in front of the path of the film holder, the upper portion and the front cover portion being removably affixed to the lower housing portion.

2. A film projector according to claim 1 including a mask member slidably mounted in the front cover portion adjacent to the first lens means for motion into and out of the light path to provide a reduced area of illumination for a piece of film having a reduced image area.

References Cited in the file of this patent

UNITED STATES PATENTS

| | | |
|---|---|---|
| 812,105 | Wetzler et al. | Feb. 6, 1906 |
| 1,075,789 | Patton | Oct. 14, 1914 |
| 1,430,494 | Correll | Sept. 26, 1922 |
| 2,276,735 | Miller | Mar. 17, 1942 |
| 2,285,915 | Dutton | June 9, 1942 |
| 2,335,697 | Reyniers | Nov. 30, 1943 |
| 2,341,223 | Lillie | Feb. 8, 1944 |
| 2,586,436 | Planer | Feb. 19, 1952 |

FOREIGN PATENTS

| | | |
|---|---|---|
| 5,504 | Great Britain | of 1907 |